United States Patent
Bracalente (10) Patent No.: US 11,078,833 B2
(45) Date of Patent: Aug. 3, 2021

(54) ROTARY INTERNAL COMBUSTION MOTOR WITH SPARK PLUGS AND PRE-HEATING SPARK PLUGS

(71) Applicant: Angelo Bracalente, Castelnuovo Rangone (IT)

(72) Inventor: Angelo Bracalente, Castelnuovo Rangone (IT)

( * ) Notice: Subject to any disclaimer, the term of this patent is extended or adjusted under 35 U.S.C. 154(b) by 65 days.

(21) Appl. No.: 16/633,486

(22) PCT Filed: Jul. 18, 2018

(86) PCT No.: PCT/EP2018/069536
§ 371 (c)(1),
(2) Date: Jan. 23, 2020

(87) PCT Pub. No.: WO2019/034356
PCT Pub. Date: Feb. 21, 2019

(65) Prior Publication Data
US 2021/0131346 A1  May 6, 2021

(30) Foreign Application Priority Data

Aug. 17, 2017   (IT) ..................... 102017000094241

(51) Int. Cl.
*F02B 53/04* (2006.01)
*F02B 53/00* (2006.01)
(Continued)

(52) U.S. Cl.
CPC .............. *F02B 53/04* (2013.01); *F01C 1/344* (2013.01); *F01C 1/3446* (2013.01);
(Continued)

(58) Field of Classification Search
CPC ........ F01C 1/344; F01C 1/3446; F02B 53/00; F02B 53/04
See application file for complete search history.

(56) References Cited

U.S. PATENT DOCUMENTS 3,918,414 A * 11/1975 Hughes ................... F02B 75/02
123/230
4,662,177 A * 5/1987 David ..................... F02B 75/04
123/18 A
(Continued)

FOREIGN PATENT DOCUMENTS

| DE | 2316529 A1 | 10/1974 |
| WO | 8801336 A1 | 2/1988 |
| WO | 2010118518 A1 | 10/2010 |

OTHER PUBLICATIONS

International Search Report for corresponding PCT/EP2018/069536.
Written Opinion of the ISA for corresponding PCT/EP2018/069536.

*Primary Examiner* — Mary Davis (57) ABSTRACT

A rotary internal combustion motor has a stator that houses a compartment defined by two opposite planar surfaces and by an annular surface with elliptical profile, inside which a rotor rotates, which includes a cylindrical drum surrounded by an annular chamber, which is divided into multiple portions by a regularly spaced set of radial blades that are slidingly housed in the cylindrical drum. The motor also has at least one pair of inlet openings, at least one pair of outlet openings, at least one pair of injectors, at least one pair of spark plugs, and at least one pair of pre-heating spark plugs.

11 Claims, 6 Drawing Sheets

(51) Int. Cl.
*F02B 53/06* (2006.01)
*F01C 1/344* (2006.01)
*F01C 21/08* (2006.01)

(52) U.S. Cl.
CPC .......... *F01C 21/0836* (2013.01); *F02B 53/00* (2013.01); *F02B 53/06* (2013.01); *F04C 2240/10* (2013.01)

(56) References Cited

U.S. PATENT DOCUMENTS

| 6,776,136 | B1 * | 8/2004 | Kazempour | .......... F01C 1/3446 123/243 |
| 2013/0340707 | A1 | 12/2013 | Garcia Rodriguez | |

* cited by examiner

ROTARY INTERNAL COMBUSTION MOTOR WITH SPARK PLUGS AND PRE-HEATING SPARK PLUGS

The present patent application for industrial invention relates to a rotary internal combustion motor.

US2013340707 discloses a rotary heat motor comprising a hollow stator, the internal surface of which is provided with a set of opposite projections.

WO8801336 discloses a motor provided with combustion chambers that are considerably larger than the inlet chambers, in such a way that the combustion gases can expand more than in a piston motor.

The purpose of the present invention is to realize a rotary internal combustion motor provided with such a structural configuration in order to operate with any type of fuel, such as gasoline, diesel oil, natural gas, liquid propane gas, etc. and perform different thermodynamic cycles, and particularly Otto cycles and Diesel cycles.

In view of the complex structural configuration of the rotary internal combustion motor according to the invention, its description is made with reference to the attached drawings, which only have an illustrative, not limiting value, wherein.

With reference to the aforementioned figures, the rotary internal combustion motor of the invention comprises a rotor (R) revolvingly housed inside a stator (S), wherefrom the driving shaft (AM) protrudes, being coupled with the rotor (R).

More precisely, the stator (S) is composed of a tight motor block, which comprises an annular shell (100) closed by an opposite pair of identical lids (101), which are fixed to the shell (100) by means of bolts (105).

Practically speaking, said shell (100) and said opposite pair of lids (101) create a compartment (102) defined by two opposite planar surfaces, coinciding with the internal walls (101a) of the lids (101), and by an annular surface with elliptical profile, coinciding with the elliptical profile of the internal wall (100a) of said shell (100).

Said rotor (R) is housed inside said compartment (102), and comprises a cylindrical drum (200) associated with said driving shaft (AM), which is supported by two main bearings (300) housed inside housings (300a) suitably obtained in the center of the two lids (101).

Figure 5:
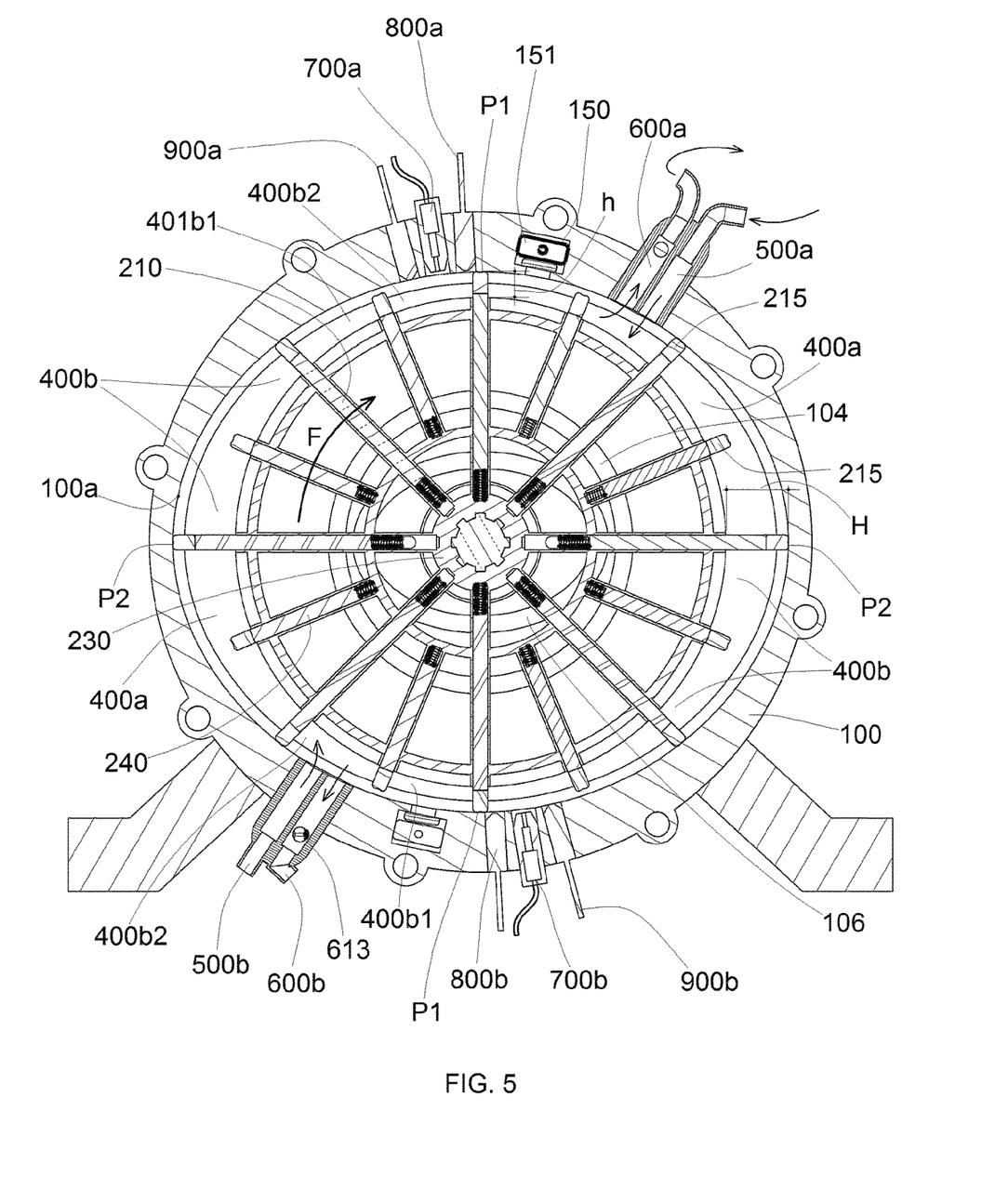
FIG. 5 is a sectional view of the motor according to the invention with a plane that is orthogonal to the axis of rotation of its driving shaft.

As shown in FIG. 5, an annular chamber (400) is disposed between the external surface (200a) of the cylindrical drum (200) and the internal wall (100a) of said shell (100); said annular chamber (400) has a constant width, which is equal to the distance between the internal walls (101a) of said opposite pair of lids (101), whereas its height, measured according to a radial direction, is gradually variable, with increasing-decreasing-increasing progress, going from a minimum value to a maximum value that are respectively repeated twice in a round angle of 360°.

Evidently, the maximum value (H) of said height is equal to the difference between the radius of the external surface (200a) of the cylindrical drum (200) and the major semiaxis of the ellipse defined by the profile of the internal wall (100a) of said shell (100), whereas the minimum value (h) of said height is equal to the difference between the radius of the external surface (200a) of the cylindrical drum (200) and the minor semiaxis of the ellipse defined by the profile of the internal wall (100a) of said shell (100).

Moreover, two identical opposite semi-chambers (400a), which develop for an arc of semicircle, are formed in said annular chamber (400).

In the enclosed figures, the points (P1 and P2) are used to indicate the points where the height of the semi-chambers (400a) has the minimum value (h) and the maximum value (H), respectively.

The rotor (R) also comprises a regularly spaced set of primary radial blades (210) that slide radially in such a way to be in a more or less ejected position with respect to the external surface (200a) of the cylindrical drum (200).

Preferably, said primary radial blades (210) are in the number of eight, as shown in the attached figures.

Figure 6:
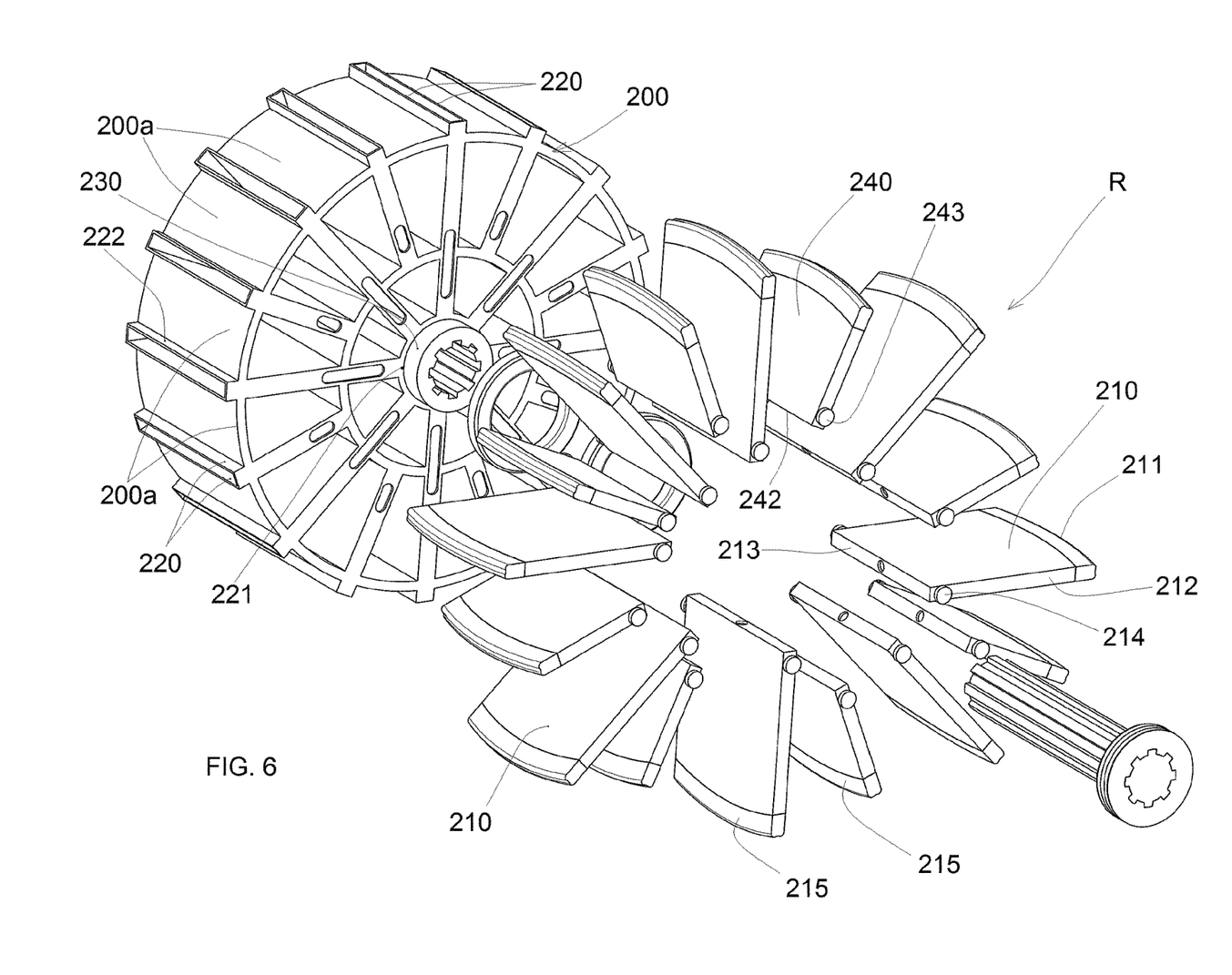
FIG. 6 is a diagrammatic axonometric exploded view of the rotor of the motor according to the invention.

As shown in FIG. 6, the top edge (211) of said radial blades (210) always adheres and slides against the internal wall (100a) of said shell (100) during the rotation of the rotor (R), whereas the lateral edges (212) of said radial blades (210) always adhere and slide against the internal walls (101a) of said lids (101) during the rotation of the rotor (R).

More precisely, each of said primary blades (210) is housed and guided inside a close parallel pair of radial partitions (220), the opposite ends of which (221 and 222) are fixed to the hub (230) of the drum (200) on one side, and to the external surface (200a) of the drum (200), on the other side.

The sliding in alternate direction of each primary blade (210) is obtained by means of a coupling of cam/tappet type between each primary blade (210) and the stator (S).

Figure 1:
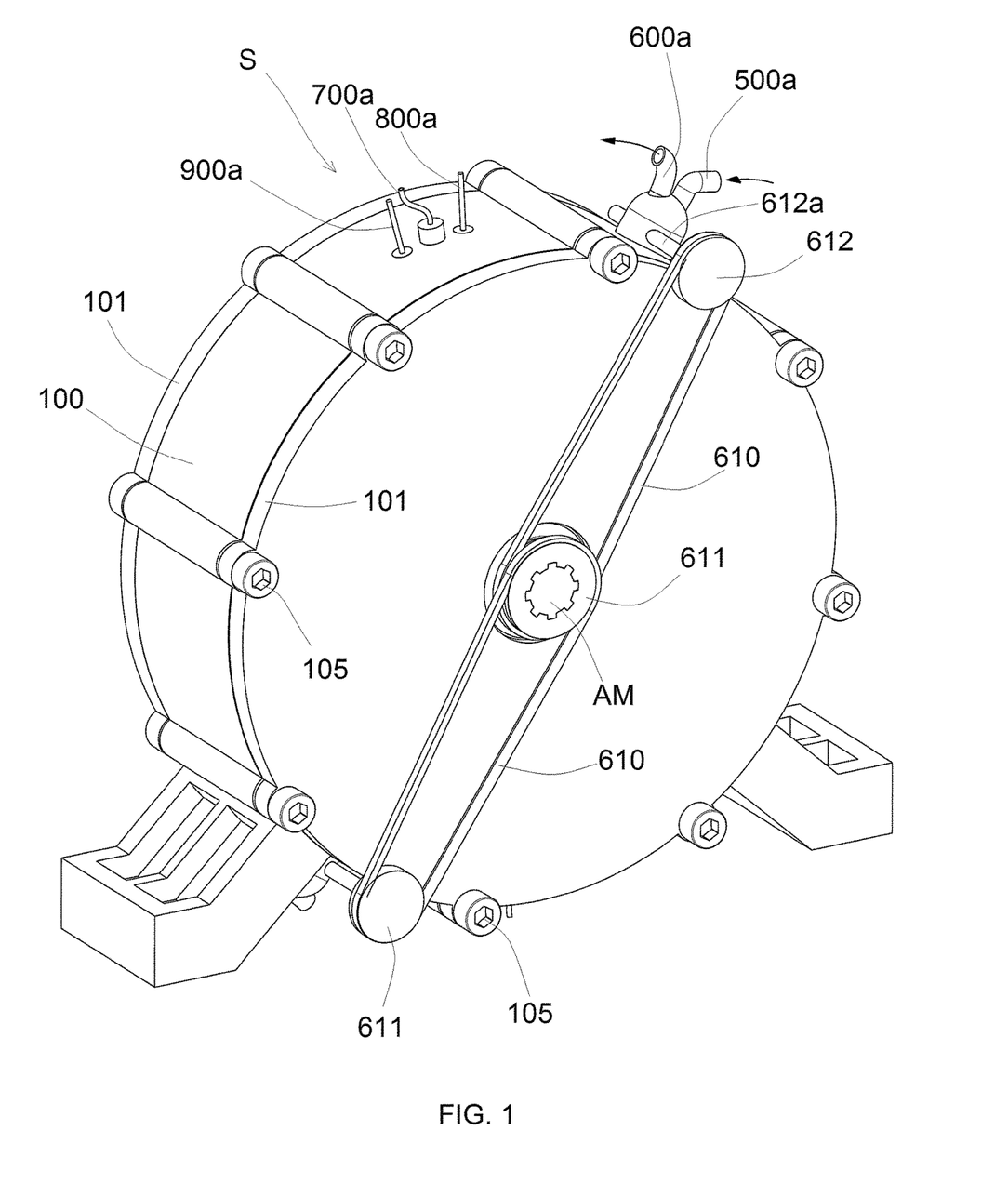
FIG. 1 is a diagrammatic axonometric view of the rotary motor of the invention, seen from the front.
Figure 2:
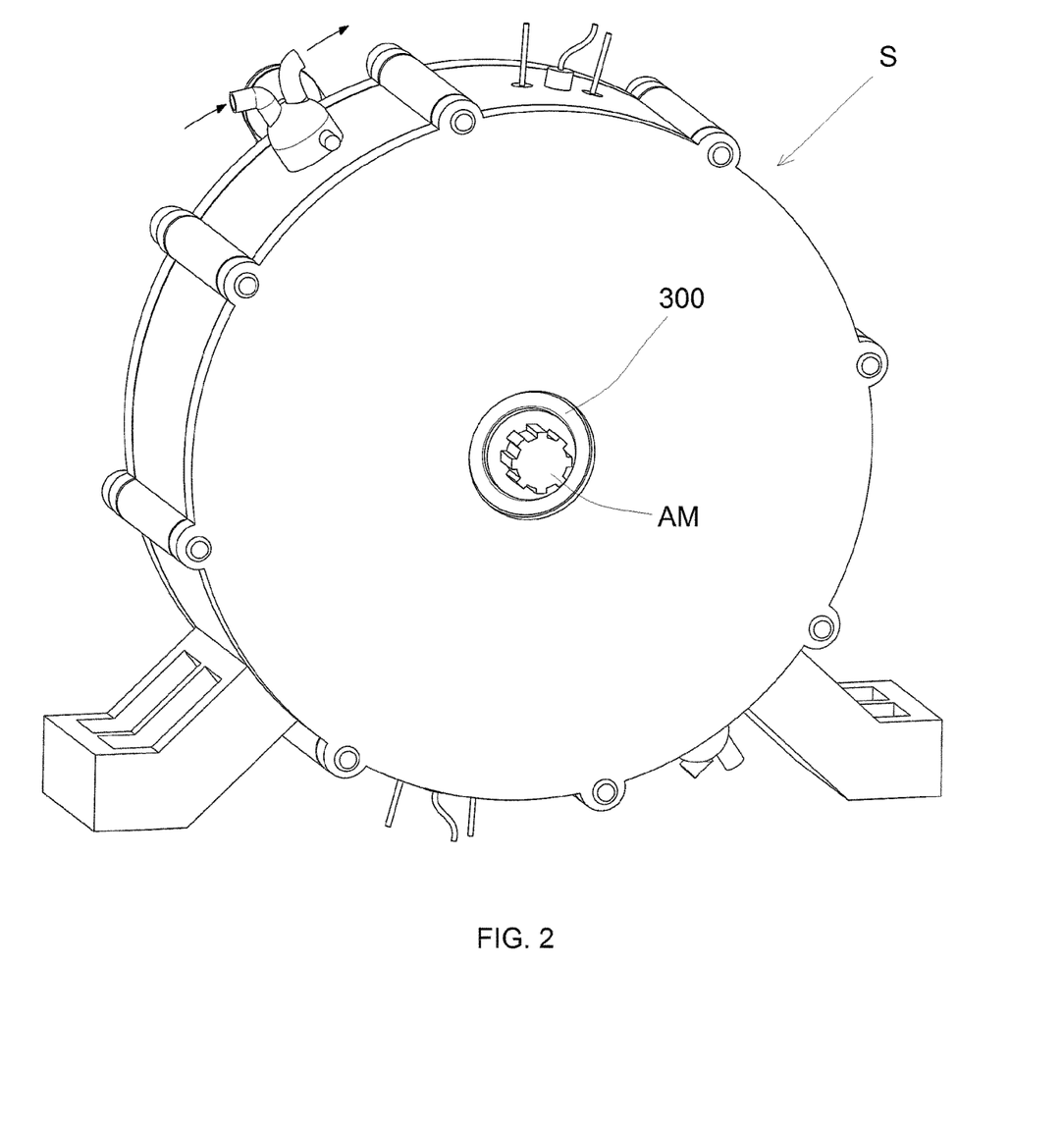
FIG. 2 is a diagrammatic axonometric view of the rotary motor according to the invention, seen from the back.
Figure 3:
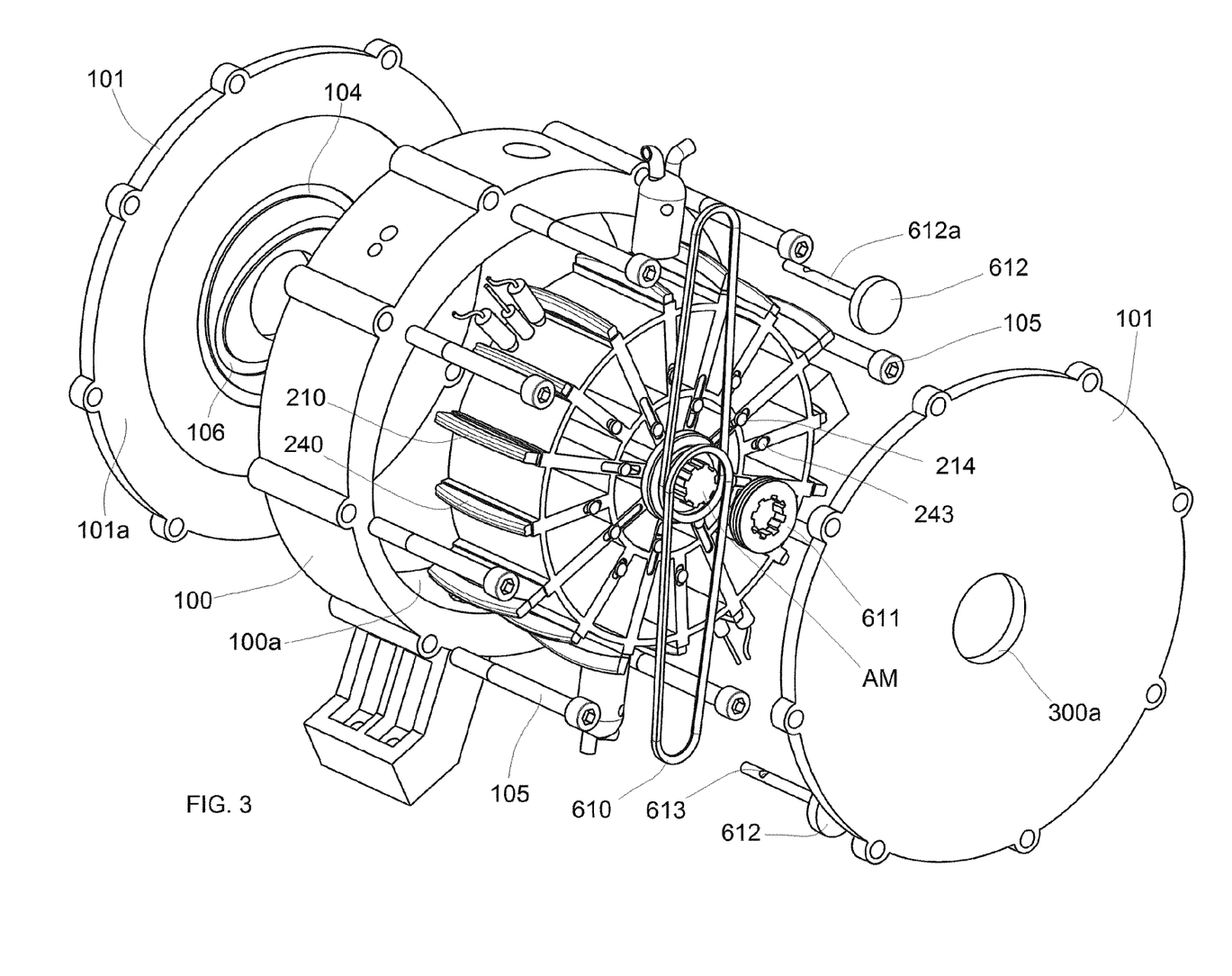
FIG. 3 is a diagrammatic axonometric exploded view of the rotary motor according to the invention, seen from the front.
Figure 4:
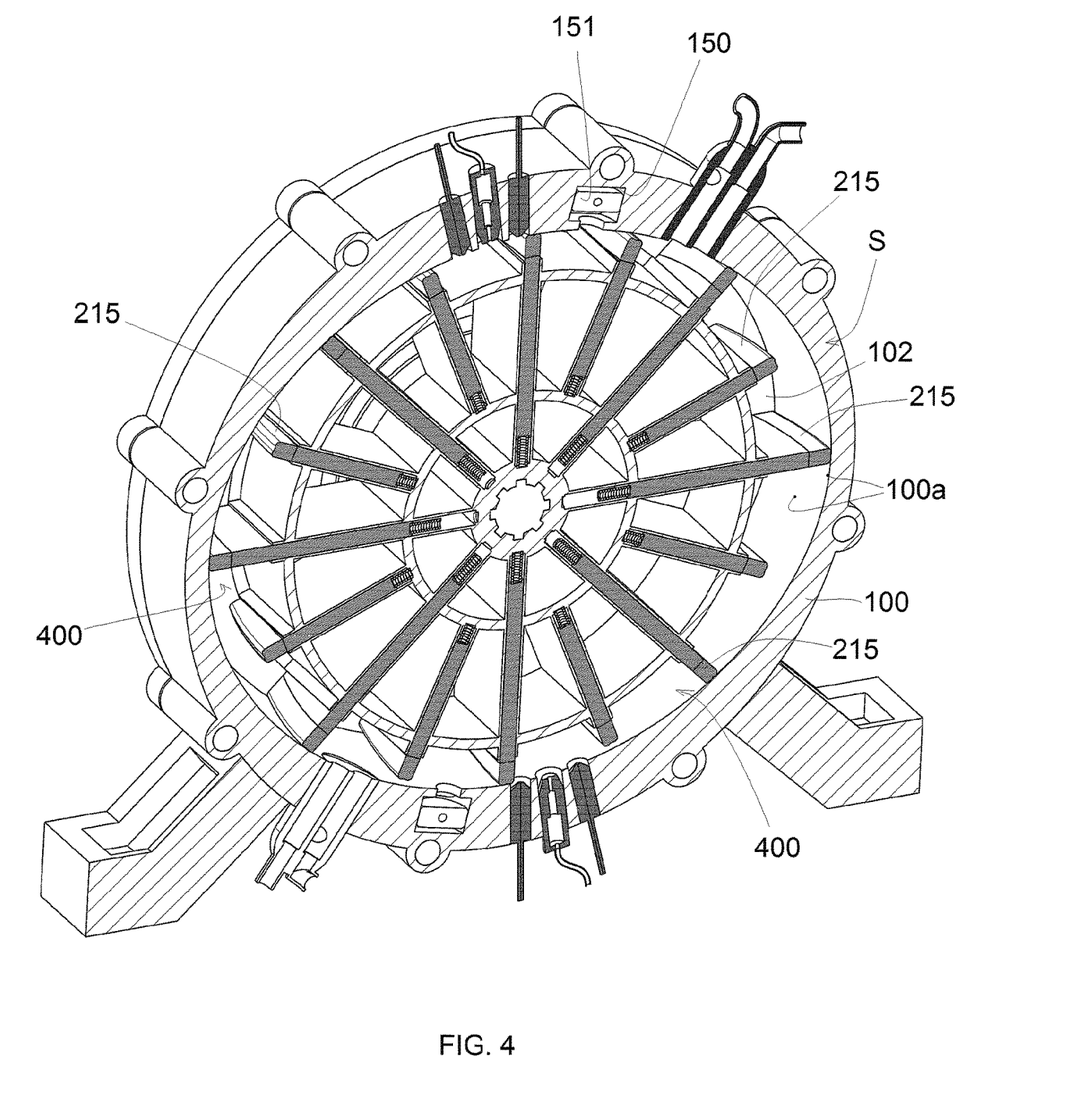
FIG. 4 is a diagrammatic axonometric view of the rotary motor according to the invention, seen from the back and sectioned with a plane that is orthogonal to the axis of rotation of its driving shaft.

As shown in FIGS. 3 and 6, each primary blade (210) is provided, at the two opposite ends of its base edge (213), with two bearings (214) that are housed and guided inside elliptical tracks (104) obtained on the internal walls (101a) of the lids (101).

Ultimately, it can be stated that the drum (200) comprises a rigid bearing framework, which comprises its hub (230), its external wall (200a) and the set of radial partitions (220), whereas the primary blades (210) are free to slide radially with respect to the framework, in spite of being constrained to rotate integrally with said rigid bearing framework.

As shown in FIG. 5, a portion (400b) of said semi-chambers (400a) is defined between a consecutive pair of primary blades (210), the volume of said portion (400b) varying progressively and cyclically during the rotation of the rotor (R) inside the stator (S).

In view of the above, during the rotation of the rotor (R), the gas that is trapped in said portions (400b) of said semi-chambers (400a) cyclically undergoes compression steps in alternation with expansion steps.

More precisely, the compression steps occur until said portions (400b) of said semi-chambers (400a) travel along the arc of circle that extends from the point (P2) to the point (P1), whereas the expansion steps occur until said portions (400b) of said semi-chambers (400a) travel along the arc of circle that extends from the point (P1) to the point (P2).

Each of said semi-chambers (400*a*) is provided with:

at least one inlet opening (500*a*) disposed in diametrally opposite position relative to the identical inlet opening (500*b*) provided for the other semi-chamber;

at least one outlet opening (600*a*) disposed in diametrally opposite position relative to the identical outlet opening (600*b*) provided for the other semi-chamber;

at least one injector (700*a*) disposed in diametrally opposite position relative to the identical injector (700*b*) provided for the other semi-chamber;

at least one spark plug (800*a*) disposed in diametrally opposite position relative to the identical spark plug (800*b*) provided for the other semi-chamber;

at least one pre-heating spark plug (900*a*) disposed in diametrally opposite position relative to the identical pre-heating spark plug (900*b*) provided for the other semi-chamber.

It must be noted that, if Otto cycles are to be performed by the rotary internal combustion motor according to the invention, the electronic control unit that controls the operation of the motor will only enable the spark plugs (800*a* and 800*b*), and not the pre-heating spark plugs (900*a* and 900*b*), and vice versa when Diesel cycles are to be performed.

Said injectors (700*a* and 700*b*) are disposed immediately upstream, according to the clockwise direction of rotation (F) of the rotor (R), the two points (P1) where the height of the semi-chambers (400*a*) has a minimum value (h).

Said pre-heating spark plugs (900*a* and 900*b*) are disposed in the proximity of said points (P1).

Said inlet openings (500*a* and 500*b*) and said outlet openings (600*a* and 600*b*) are disposed downstream the points (P1) where the height of the semi-chambers (400*a*) has the minimum value (h), but upstream the two points (P2) where the height of the semi-chambers (400*a*) has the maximum value (H).

It must be noted that, in the internal combustion motor according to the invention, air is always and only extracted through the inlet openings (500*a* and 500*b*), whereas the fuel of the preferred kind is introduced in the portions (400*b*) of said semi-chambers (400*a*) always and only through the injectors (700*a* and 700*b*).

Moreover, it must be noted that, in order to change the compression ratios that, as it is known, are much higher in Diesel cycles than in Otto cycles, the rotary internal combustion motor of the invention comprises at least one pair of pre-chambers (150) with variable volume in diametral opposite position and in communication with the annular chamber (400).

More precisely, said pre-chambers (150) are disposed in the proximity of the points (P1) where the minimum height (h) of the annular chamber (400) is measured.

In other words, using a typical term of alternative internal combustion motors, it may be stated that this area astride the points (P1) may be identified with the cylinder of the rotary internal combustion motor of the invention, since the maximum fluid compression is herein achieved and said injectors, said spark plugs, said pre-heating spark plugs, said inlet openings and said outlet openings are herein disposed.

Said pre-chambers (150) house sliders (151) that allow for changing their volume and consequently also the volume of the portions (400*b*) of said semi-chambers (400*a*) that are momentarily in communication with said pre-chambers (150).

It is important to note that said volume variation—which consequently determines a variation of the compression ratio—can be obtained without stopping the motor or, otherwise said, during the rotation of the rotor (R).

Finally, it must be noted that, for the time in which a portion (400*b*) of said semi-chambers (400*a*) remains in communication both with the inlet openings and with the outlet openings, as it occurs in the typical washing step of two-stroke internal combustion motors with alternate motion, two countercurrent flows are inevitably formed in said portion (400*b*) of said semi-chambers (400*a*): a first flow is caused by the combusted gases in the expansion step that come out of the outlet openings (600*a* and 600*b*), and a second flow caused by the air that is extracted through the inlet openings (500*a* and 500*b*).

In fact, the occurrence of the two countercurrent flows is not detrimental like the washing step in the alternative internal combustion motors with carburation because only air (and not a mixture of air and gasoline) is introduced from the inlet openings (500*a* and 500*b*), which can be perfectly used to wash the portion (400*b*) of said semi-chambers (400*a*) where the discharge step of the combustion gases occurs.

According to the preferred embodiment of the present invention, the rotor (R) also comprises a set of secondary blades (240), which are alternated to the primary blades (210), sliding radially.

Said set of secondary blades (240) substantially has the same structural configuration and the same type of actuation as the primary blades (210), the only difference being that said secondary blades (240) adhere and slide against the internal wall (100*a*) of said shell (100) only for a small angle.

The expulsion of said secondary blades (240) from the external surface (200*a*) of the drum (200) at the right moment halves the volume of said portions (400*b*) of said semi-chambers (400*a*).

More precisely, as shown in FIG. 5, each secondary blade (240) slides against the internal wall (100*a*) of said shell (100) only for an arc of circle that extends astride the points (P1), in such a way as to divide in two semi-portions (400*b*1 and 400*b*2) the portion (400*b*) of said semi-chambers (400*a*) that is completing the compression step and is about to start the combustion step, said combustion step affecting both semi-portions (400*b*1 and 400*b*2), where two expansion steps occur in immediately consecutive order, after passing beyond the point (P1).

Each secondary blade (240) is retracted in the drum (200) as soon as it passes beyond the outlet opening (600*a*, 600*b*).

The advantage given by the provision of the secondary blades (240) consists in the extension of the expansion step of each portion (400*b*) of said semi-chambers (400*a*) beyond the moment in which a portion (400*b*) of said semi-chambers (400*a*) enters into communication with the outlet opening (600*a*, 600*b*).

As a matter of fact, when a portion (400*b*) of said semi-chambers (400*a*) is divided in two semi-portions (400*b*1 and 400*b*2), the exhaust step only starts in the semi-portion (400*b*2) that enters in communication with the outlet openings (600*a*, 600*b*), whereas the expansion step continues in the other semi-portion (400*b*1), at least until this semi-portion (400*b*1) enters in communication with the outlet openings (600*a*, 600*b*).

The sliding in alternate direction of each secondary blade (240) is obtained by means of a coupling of cam/tappet type between each secondary blade (240) and the stator (S).

More precisely, each secondary blade (240) is provided, at the two opposite ends of its base edge (242), with two bearings (243) that are housed and guided inside elliptical tracks (104) obtained on the internal walls (101*a*) of the lids (101).

It must be noted that, while it can perform "Otto" cycles and "diesel" cycles with four strokes, the aforementioned internal combustion motor can operate without valves according to the typical operation modes of alternative two-stroke motors.

In any case, exhaust valves (613) are provided on the outlet openings (600a and 600b) in order to increase the motor performance.

In the embodiment of the invention provided with exhaust valves (613), it is evidently necessary to provide suitable distribution parts that, according to the preferred embodiment shown in the attached drawings, comprise a double toothed belt (610) wound on driving pulleys (611) keyed to the driving shaft (AM) and on driven pulleys (612), the rotational shaft of which (612a) actuates the closing and opening means of said exhaust valves (613).

Evidently, the provision of exhaust valves (613) avoids the need to provide the secondary blades (240).

Finally, it must be noted that interchangeable compression rings (215) are applied on the top edge (211) and on the lateral edges (212) of the primary blades (210), as well as on the sides and on the top edge of said secondary blades (240), as shown in FIG. 6.

It must be noted that each one of the two semi-chambers (400a) contains elements that move with circular motion or with alternate linear motion, but in any case always in balanced equilibrium, since all the parts contained in the two semi-chambers (400a) are symmetrically corresponding and diametrally opposite.

In fact, if we consider two portions (400b) of said semi-chambers (400a) in diametrally opposite position, it can be noted that they symmetrically undergo the same step, while they individually develop the sequence in the four steps provided by the Otto/Diesel cycles.

So, during a 360° revolution of the rotor (R), two simultaneous thermal cycles are actuated in the semi-chambers (400a), always with balanced equilibrium and perfect symmetry.

In view of the above, the advantage of the rotary internal combustion motor according to the invention is that every generated force is compensated by another equivalent opposite force, so that no forces or masses without equilibrium are to be compensated.

The additional advantages of the rotary internal combustion motor according to the present invention are the possibility of coupling multiple driving units on the same shaft motor, its light weight and the resistance of its parts because no parts operate under excessive stress. Moreover, assembly during production or maintenance can be considerably simplified, replacing worn-out parts by simply opening the lateral lids (101).

The invention claimed is:

1. Rotary internal combustion motor comprising:
    a stator composed of a tight motor block, which comprises an annular shell closed by an opposite pair of identical lids, which house a compartment defined by two opposite planar surfaces, coinciding with the internal walls of the lids, and by an annular surface with elliptical profile, coinciding with the elliptical profile of the internal wall of said shell;
    a rotor, which is housed inside said compartment and comprises a cylindrical drum associated with a driving shaft supported by two main bearings housed inside bearing housings in the center of the two lids;
    an annular chamber disposed between the external surface of the cylindrical drum and the internal wall of said shell, wherein said annular chamber has a constant width, which is equal to the distance between the internal walls of said opposite pair of lids, whereas its height, measured according to a radial direction, is gradually variable, with increasing-decreasing-increasing progress, going from a minimum value to a maximum value that are repeated twice in a round angle of 360°; said annular chamber is formed of a pair of identical opposite semi-chambers;
    a regularly spaced set of primary radial blades intended to define portions of said semi-chambers, housed inside said cylindrical drum and radially sliding, the primary radial blades moving with respect to the external surface of the cylindrical drum, so that the top edge of said radial blades always adheres and slides against the internal wall of said shell during the rotation of the rotor, and the lateral edges of said primary radial blades always adhere and slide against the internal walls of said lids during the rotation of the rotor;
    at least one pair of inlet openings disposed in diametrally opposite positions, downstream the two points where said minimum height of the annular chamber is measured, along the direction of rotation of the rotor;
    at least one pair of outlet openings disposed in diametrally opposite positions, downstream the two points where said minimum height of the annular chamber is measured, along the direction of rotation of the rotor;
    at least one pair of injectors disposed in diametrally opposite positions, upstream the two points where said minimum height of the annular chamber is measured;
    at least one pair of spark plugs disposed in diametrally opposite positions is located within a spacing between adjacent primary radial blades at the two points where said minimum height of the annular chamber is measured;
    at least one pair of pre-heating spark plugs disposed in diametrally opposite positions is located within a spacing between adjacent primary radial blades at the two points where said minimum height of the annular chamber is measured.

2. The rotary internal combustion motor of claim 1, which comprises coupling means of cam/tappet between each primary radial blade and the stator in order to make each primary radial blade slide in alternate direction.

3. The rotary internal combustion motor of claim 2, wherein each primary radial blade is provided, at the two opposite ends of its base edge, with two bearings that are housed and guided inside elliptical tracks obtained on the internal walls of the lids.

4. The rotary internal combustion motor of claim 1, wherein each of said primary radial blades is housed and guided inside a close parallel pair of radial partitions, the opposite ends of which are fixed to the hub of the drum on one side, and to the external surface of the drum, on the other side.

5. The rotary internal combustion motor of claim 1, comprising a set of secondary blades radially sliding with respect to the drum and alternate to said primary radial blades, with respect to which said set of secondary blades substantially has the same structural configuration and actuation; said secondary blades adhere and slide against the internal wall of said shell of the stator only for an angle astride the points.

6. The rotary internal combustion motor of claim 5, wherein each of said secondary blades slides against the internal wall of said shell to divide the space between two adjacent primary radial blades in two semi-portions located only where said semi-chambers is completing the compression step and is about to start the combustion step, whereas each secondary blade is retracted in the drum as soon as it passes beyond the outlet opening.

7. The rotary internal combustion motor of claim 6, wherein each primary radial blade is provided, at the two opposite ends of its base edge, with two bearings that are housed and guided inside elliptical tracks obtained on the internal walls of the lids.

8. The rotary internal combustion motor of claim 1, comprising at least one pair of pre-chambers in diametrally opposite position, with variable volume and in communication with the annular chamber; said pre-chambers being respectively disposed within a spacing between adjacent primary radial blades at the two points where the minimum height of the annular chamber is measured.

9. The rotary internal combustion motor of claim 8, wherein said pre-chambers house sliders that allow for changing their volume and consequently also the volume of the portions of said semi-chambers that are momentarily in communication with said pre-chambers.

10. The rotary internal combustion motor of claim 1, comprising:
   exhaust valves on the outlet openings; and
   valve gear for opening and closing the exhaust valves.

11. The rotary internal combustion motor of claim 10, comprising a double toothed belt wound on driving pulleys keyed to the driving shaft and to driven pulleys, a rotational shaft of which actuates the closing and opening means of said exhaust valves.

\* \* \* \* \*